3169X
No Printed Specification Available
I. Town.
Truss Bridge.
No.
Patented Jan. 28, 1820.
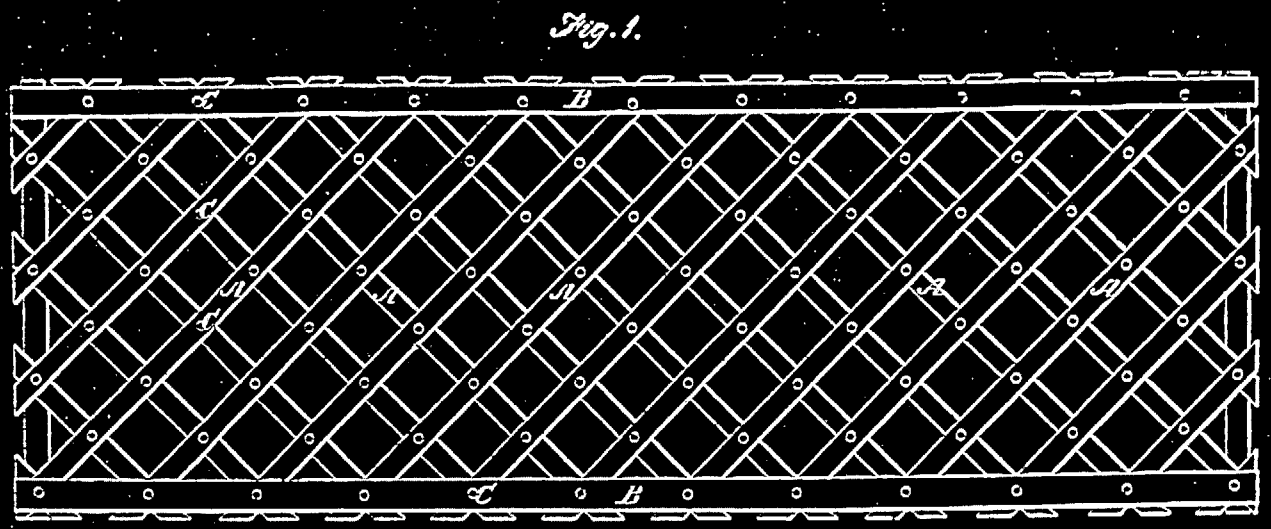
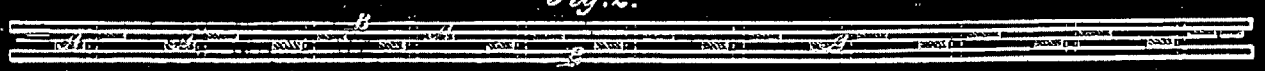
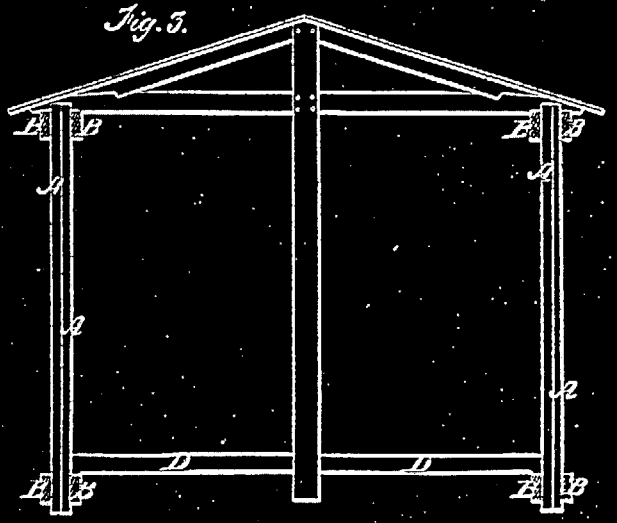

...s of any institution or individual.

Ithiel Town 3169X

Letters Patent

The Schedule referred to in these Letters Patent and making part of the same containing a description in the words of the said Ithiel Town himself of his improvement in Bridges.

Suppose a vertical plane against the side of which are placed the sides of of a number of equal and similar flat pieces of timber or other substances of suitable dimensions in such manner as that they shall be parallel to each other say between two horizontal lines in the plane and incline so as to make an angle with the horizontal lines, of about 45° or any angle that may be necessary for a brace (as they do the office of a brace) after which place another series of timbers, or other substances of equal dimensions, distance apart and inclination to the horizontal lines in the same manner and between the same parallels into equal diamonds and half diamonds. Hence the longer the pieces are in proportion to the distance between them the smaller will be the diamonds the more times each piece in one series will be crossed by those of the other series, consequently the greater number of joints, and therefore the more strength and less strain upon each joint when weight or power is applied. But as all plain figures of more than three sides are susceptible of having their angles and areas varied, as also the relative position of their sides so the above diamond work if secured at all all by joints or intersections would be insufficient to resist power properly applied to it for the purpose of deranging or altering its diamond divisions without other timbers or other substances running horizontally vertically or otherwise so as to serve as diagonals to a suitable number of the diamonds and thereby dividing them into triangles. figures which are not susceptible of the change before stated: of position, angles and area. supposing then the combination of timbers or other substances to remain in the same position as before stated. but that the supposed vertical plane be removed; suppose also that two timbers or other substances of sufficient tension strength be applied one on each side of the lower ends of the two series of timbers or other substances as to

[illegible] ...ing made [illegible]

lay horizontally and have their centres correspondent to or pass through or over the centres of those lower points; and that also two other timbers or other substances capable of bearing a sufficient thrust strain pass like manner along on each side of the upper ends as points of the two series of timbers or other substances. and also if necessary other similar horizontal pieces may be placed in like manner on each side of the intermediate rows of points next to the two former ones and so on as far as the extent of the contemplated arch or span may require. after which secure all the points by 1. 2. 3 or more trunnels or iron bolts with wedges to the trunnels and heads and nuts to the bolts to keep all the parts of each point in close contact. If this combination be extended to any necessary length and pieces or other supports be placed at any reasonable distance from each other and the size and quantity of the substances of which the parts are composed be suitable to this distance between the pieces or supports considered in connection with the weight that is necessary the combination should sustain as also the manner the weight will be distributed upon it. then will this construction become the best of a Bridge in which it is supposed. the least weight of materials, least expense, but greatest strength and permanency will be found. it will be subject to the least and easiest repair and have no lateral pressure against the piers or abutments, but containing its whole strength and power to support weight within itself, and only requiring particular supports for its own weight. Should circumstances or taste require any curve for the intrados of an arch leaving the extrados still a straight line or any curve either with its convex side up or in an inverted position or should the extrados be thus varied and the intrados remain a horizontal line the principle as to arrangement of materials and as to connecting the points will remain the same. it only requiring that the upper and lower ranges of points or intersections of the two series of braces should fall regularly into the lines or curves of the intrados and extrados and which will form the intermediate rows or ranges of intersections so as regularly to harmonize the intrados or extrados by intermediate stringers or curve pieces passing over the points on each side and secured by trunnels or bolts to as before m[illegible]

3169X

[illegible] strength [illegible] This improvement differs from other Bridges principally in the arrangement or distribution of the materials, in the quantity of materials in the size of the pieces and in the manner of securing or connecting the materials at the joints should iron be used in the construction of the trusses especially cast iron, the construction at the joints might be formed in part by flanges or otherwise so as to require if any but one bolt to a joint and the pieces might be somewhat reduced between the joints without disadvantage to the strength of the truss A bridge may be formed of one or more truss or trusses and the floor placed on any of the horizontal string pieces that the circumstances may require. in case only one truss is to be used the floor may project on each side having its outer edges suspended to the top string piece of the truss with rafters braced by oblique boarding for strongling. Or if the floor lay too high up in the truss, its outer edges might be braced wholly or in part from the lower string piece and so secured as by resting on the piers to retain its proper position and strength Ithiel Town Witnesses
J. B. Shepherd
John [illegible]

(Patented 28 Jany 1820)